(12) United States Patent
Liu et al.

(10) Patent No.: US 12,256,665 B1
(45) Date of Patent: Mar. 25, 2025

(54) CAN-BUS-BASED ELECTRICAL CONTROL SYSTEM FOR ELECTRIC MOWER

(71) Applicant: LUOYANG TRACTOR RESEARCH INSTITUTE CO., LTD, Luoyang (CN)

(72) Inventors: Mengnan Liu, Luoyang (CN); Zhanpo Xue, Luoyang (CN); Jianhua Wang, Luoyang (CN); Xin Zhao, Luoyang (CN); Fuqiang Guo, Luoyang (CN); Liyou Xu, Luoyang (CN); Meng Wu, Luoyang (CN); Zhigang Yang, Luoyang (CN); Chunping Li, Luoyang (CN)

(73) Assignee: LUOYANG TRACTOR RESEARCH INSTITUTE CO., LTD, Luoyang (CN)

( * ) Notice: Subject to any disclaimer, the term of this patent is extended or adjusted under 35 U.S.C. 154(b) by 0 days.

(21) Appl. No.: 18/977,384

(22) Filed: Dec. 11, 2024

Related U.S. Application Data

(63) Continuation of application No. PCT/CN2023/070745, filed on Jan. 5, 2023.

(30) Foreign Application Priority Data

Jul. 1, 2022 (CN) .......................... 202210766934.0

(51) Int. Cl.
A01D 34/00 (2006.01)
A01D 34/66 (2006.01)
(Continued)

(52) U.S. Cl.
CPC .......... *A01D 34/006* (2013.01); *A01D 34/66* (2013.01); *A01D 34/78* (2013.01); *A01D 69/02* (2013.01);
(Continued)

(58) Field of Classification Search
CPC ...... A01D 34/006; A01D 34/66; A01D 34/78; A01D 69/02; A01D 2101/00; B60L 58/12;
(Continued)

(56) References Cited

U.S. PATENT DOCUMENTS 6,338,013 B1 * 1/2002 Ruffner .................. B60L 3/106
                                                        180/443
9,265,196 B2 * 2/2016 Albinger ................ A01D 34/78
(Continued)

FOREIGN PATENT DOCUMENTS

CN         1721226 A      1/2006
CN       101227365 A      7/2008
(Continued)

OTHER PUBLICATIONS

International Search Report of the International Searching Authority for State Intellectual Property Office of the People's Republic of China in PCT application No. PCT/CN2023/070745 issued on Jun. 9, 2023, which is an international application to which this application claims priority.

(Continued)

*Primary Examiner* — Gertrude Arthur Jeanglaude

(57) ABSTRACT

Provided is a controller area network (CAN)-bus-based electrical control system for an electric mower. Based on CAN bus technology design, an energy source control module, an instrument display module, a traveling control module, a mowing control module and a sensor module in the electrical control system implement signal collection, reception, analysis, processing and transmission by a CAN module and an interface of the CAN module the integration level and information processing efficiency of the electric mower. An intelligent boundary of the electric mower is expanded by a topological structure of a CAN bus, and a (Continued)

development platform is provided for information-based precise control of the mower.

8 Claims, 7 Drawing Sheets

(51) Int. Cl.
| | | |
|---|---|---|
| A01D 34/78 | (2006.01) | |
| A01D 69/02 | (2006.01) | |
| A01D 101/00 | (2006.01) | |
| B60K 1/02 | (2006.01) | |
| B60L 58/12 | (2019.01) | |
| B60R 16/023 | (2006.01) | |

(52) U.S. Cl.
CPC ............ *A01D 2101/00* (2013.01); *B60K 1/02* (2013.01); *B60L 58/12* (2019.02); *B60L 2200/40* (2013.01); *B60L 2240/545* (2013.01); *B60L 2240/547* (2013.01); *B60L 2240/549* (2013.01); *B60R 16/0231* (2013.01)

(58) Field of Classification Search
CPC ........... B60L 2200/40; B60L 2240/545; B60L 2240/547; B60L 2240/549; B60K 1/02; B60R 16/0231
See application file for complete search history.

(56) References Cited

U.S. PATENT DOCUMENTS

| | | | | |
|---|---|---|---|---|
| 9,446,705 | B2 * | 9/2016 | Dwyer | A01D 34/828 |
| 10,058,031 | B1 * | 8/2018 | Brown | B60K 7/0007 |
| 11,107,017 | B2 * | 8/2021 | Tatge | G06F 13/4282 |
| 11,127,228 | B1 * | 9/2021 | Brown | G07C 5/0841 |
| 11,941,554 | B2 * | 3/2024 | Tatge | H04W 4/029 |
| 2010/0123980 | A1 * | 5/2010 | Lee | B23D 59/00 |
| | | | | 361/23 |
| 2012/0159916 | A1 | 6/2012 | Ishii et al. | |

FOREIGN PATENT DOCUMENTS

| | | |
|---|---|---|
| CN | 101811484 A | 8/2010 |
| CN | 206719141 U | 12/2017 |
| CN | 108710084 A | 10/2018 |
| CN | 109463095 A | 3/2019 |
| CN | 110915404 A | 3/2020 |
| CN | 212694265 U | 3/2021 |
| CN | 115039560 A | 9/2022 |
| EP | 3081068 A1 | 10/2016 |
| EP | 2011188789 A1 | 10/2016 |

OTHER PUBLICATIONS

China National Intellectual Property Administration, First Office Action in Chinese Patent Application No. 202210766934.0 issued on Feb. 1, 2024, which is a foreign counterpart application corresponding to this U.S. Patent Application, to which this application claims priority.
China National Intellectual Property Administration, Second Office Action in Chinese Patent Application No. 202210766934.0 issued on Jun. 6, 2024, which is a foreign counterpart application corresponding to this U.S. Patent Application, to which this application claims priority.
Notification to Grant Invention Patent Right n Chinese Patent Application No. 202210766934.0 issued on Oct. 10, 2024.

* cited by examiner

CAN-BUS-BASED ELECTRICAL CONTROL SYSTEM FOR ELECTRIC MOWER

CROSS-REFERENCE TO RELATED APPLICATION

This application is a continuation application of international application No. PCT/CN2023/070745, filed on Jan. 5, 2023, which claims priority to Chinese Patent Application No. 202210766934.0, filed on Jul. 1, 2022, the disclosures of which are herein incorporated by reference in their entireties.

TECHNICAL FIELD

The disclosure relates to an electrical control system for a zero-turning-radius pure electric riding mower, and particularly relates to a controller area network (CAN)-bus-based electrical control system for an electric mower.

BACKGROUND

Mowers, a type of garden tool, have been widely used in the field of lawn and vegetation trimming. Existing mowers are typically divided into hand-held mowers and riding mowers, and are primarily categorized as electric mowers and fuel-operated mowers according to their energy systems. However, the existing mowers are inferior in terms of mowing capacity, mowing efficiency, range time, mowing area, offline application scenarios, etc., and are low in overall degree of electrification and intelligence. With a large number of electronic devices used in the electric mower as well as the technical demand generated for more versatile, more intelligent and unmanned mowers in the future, various control units of the electric mower need to collect, analyze, process and interactively feedback a large amount of information. At present, the existing product technology on the market cannot satisfy interaction of a large amount of information of the electric mower, the future demand for intelligence. Thus, how to provide a CAN-bus-based electrical control system for an electric mower has become a long-term technical target of those skilled in the art.

SUMMARY

In order to overcome some issues in the related art, the disclosure provides a controller area network (CAN)-bus-based electrical control system for an electric mower. In the CAN-bus-based electrical control system, after address distribution is performed on each control module, signals are processed and transmitted after collected, received, and analyzed by a CAN bus so that the problem of low degrees of informatization and intelligence of existing mowers can be effectively solved.

In order to achieve the above objective of the disclosure, the disclosure uses the following technical solution:

A CAN-bus-based electrical control system for an electric mower includes an energy source control module, an instrument display module, a traveling control module, a mowing control module, a sensor module, a high-speed CAN bus and a low-speed CAN bus, where the energy source control module is connected to the sensor module, the instrument display module, the mowing control module and the traveling control module respectively by the high-speed CAN bus, so that communication of the energy source control module with the sensor module, the instrument display module, the mowing control module and the traveling control module is implemented; a master controller and a slave controller of the energy source control module are in communication by the low-speed CAN bus, so that communication between the master controller and slave controller is implemented;

the energy source control module provides final drive energy and stores feedback energy of an electric mower;

the instrument display module displays a system operation state and fault key information of the electric mower, and gives an alarm;

the traveling control module includes a plurality of sub-modules, to implement signal processing and drive control over a traveling motor of the electric mower;

the mowing control module includes a plurality of sub-modules, to implement signal processing and drive control over a mowing motor;

the sensor module collects signals in forms of a hardwire signal, a switch signal, a voltage signal and a pulse signal, and performs state interaction by the high-speed CAN bus; and a logic threshold-based control mode is used between the energy source control module and the instrument display module, the traveling control module, the mowing control module and the sensor module, and for processing of a motor signal, a safety switch signal, a battery signal, a braking signal and a control device signal, the signals are encapsulated, transmitted, analyzed and expressed by a CAN protocol packet, so that identification of a traveling state and a mowing state of the mower and control over fault diagnosis and alarming are implemented.

In the CAN-bus-based electrical control system for an electric mower, the energy source control module includes functions of battery state monitoring, battery state analysis, switch control, energy management, battery safety protection, CAN communication management and charge management, and the energy source control module performs battery state analysis by monitoring a voltage of a battery cell, a total voltage of a battery, a charge-discharge current, a temperature of the battery and a signal, performs switch control according to a requirement of a control policy, to implement charge-discharge control management of the battery, and performs real-time battery fault diagnosis and processing in a charge-discharge process.

In the CAN-bus-based electrical control system for an electric mower, the function of battery state monitoring includes battery cell voltage monitoring, total voltage monitoring, current monitoring, temperature monitoring and signal monitoring; the function of battery state analysis includes battery state of charge (SOC) estimation, battery state of health (SOH) estimation and battery state of power (SOP) estimation, where an SOC is a current remaining electric quantity value of the battery, an SOH is a current health state value of the battery, and an SOP is estimated power of the battery; the function of switch control includes control over a charge-discharge relay or a metal-oxide-semiconductor (MOS) field-effect transistor, and a heating relay; the function of energy management includes battery charge-discharge control management and balance functions; the function of battery safety protection includes battery fault diagnosis and processing and loop interlock function detection; the function of CAN communication management includes CAN communication, diagnosis, calibration and program update of the electric mower; and the function of charge management includes communication between and monitoring of a charging process between the battery and a charger.

In the CAN-bus-based electrical control system for an electric mower, the instrument display module includes functions of CAN communication management, central information processing, fault alarming and information display, the instrument display module analyzes and displays key information of the electric mower, first, CAN bus information is collected and analyzed by a function of high-speed CAN communication management, valid information is analyzed and amplified according to CAN protocol provisions and then transmitted to a microcontroller unit, and after central information analysis, an instrument display screen is driven to display information of an accumulated mileage, an electric quantity, a fault code, a braking state, a driving speed state, and a mowing speed state, and at the same time voice alarming is driven in real time according to logic determination.

In the CAN-bus-based electrical control system for an electric mower, the function of CAN communication management is to collect the CAN bus information, analyze and amplify the CAN bus information and transmit the CAN bus information to the microcontroller unit; the function of central information processing is configured to analyze a signal and drive the instrument display screen and voice alarming; and the information display is to display CAN bus analysis information by a display screen module, and displayed information includes the accumulated mileage, the electric quantity, the fault code, the braking state, the driving speed state, and the mowing speed state.

In the CAN-bus-based electrical control system for an electric mower, the traveling control module includes a left traveling control sub-module and a right traveling control sub-module, and the two traveling control sub-modules respectively control operation of two motors to achieve traveling and differential steering of the electric mower.

In the CAN-bus-based electrical control system for an electric mower, each of the traveling control sub-modules includes functions of power source conversion, signal collection, CAN communication management, motor control, motor enable management and fault monitoring analysis, where the function of power source conversion includes converting a high-voltage direct-current power source into a low-voltage direct-current power source for internal use by the traveling control module and external output, and maintaining a stable and reliable voltage output; the function of signal collection includes collection and conversion of signals from a motor Hall position sensor, a seat sensor, a control handle sensor, and an enable switch; the function of CAN communication management is configured for traveling control and includes functions of CAN communication, diagnosis, calibration, and program update of the electric mower and electric mower state message interaction; the function of motor control includes motor phase change control, and speed loop and current loop closed-loop control; the function of motor enable management is to determine a safety condition of motor driving by a safety analysis control module; and the function of fault monitoring analysis is a fault monitoring analysis function.

In the CAN-bus-based electrical control system for an electric mower, the mowing control module includes a left mowing control sub-module and a right mowing control sub-module, and the two mowing control sub-modules respectively control driving of two mowing motors to implement an output function of an electric mower and a tool.

In the CAN-bus-based electrical control system for an electric mower, each of the mowing control sub-modules includes functions of power source conversion, signal collection, CAN communication management, motor control, motor enable management and fault monitoring analysis, where the function of power source conversion includes converting a high-voltage direct-current power source into a low-voltage direct-current power source for internal use by the mowing control module and external output, and maintaining a stable and reliable voltage output; the function of signal collection includes collection and conversion of signals from a seat sensor, a control handle sensor, and an enable switch; the function of CAN communication management is configured for motor control and includes functions of CAN communication, diagnosis, calibration, and program update of the electric mower and electric mower state message interaction; the function of motor control includes motor phase change control, and speed loop and current loop closed-loop control; the function of motor enable management is to determine a safety condition of motor driving by a safety analysis control module; and the function of fault monitoring analysis is a fault monitoring analysis function.

In the CAN-bus-based electrical control system for an electric mower, the sensor module includes a seat state sensor, a motor Hall sensor, a braking state sensor, a driving angle sensor, a Hall sensor, a handle enable sensor, a charge state sensor, a traveling speed state control switch and a plurality of enable switches, where the seat state sensor is configured to detect whether a driver is present in a seat, the braking state sensor is configured to detect whether the electric mower is in a braking and parking state, the charge state sensor is configured to detect whether the electric mower is being charged, the handle enable sensor is configured to detect whether a handle is controlled effectively, and serves as a safety device, and the signals provide conditions for safety determination, so that a traveling controller and a mowing controller determine whether the electric mower is operable; the motor Hall sensor is configured to monitor rotating speeds of a left traveling motor and a right traveling motor, and a control handle angle sensor converts a mechanical stroke of a control handle into an electric angle for a traveling motor controller to control an electric mower speed; and the traveling speed state control switch, a mowing speed state control switch and a light switch are configured to provide input command signals for determining an electric mower state, and the signals are finally communicated to other control modules by the high-speed CAN bus.

By using the above technical solution, the disclosure has the following advantages:

According to the disclosure, based on CAN bus technology design, all control modules in an electrical system of the electric mower implement signal collection, reception, analysis, processing and transmission by a CAN module and an interface of the CAN module to improve information processing efficiency of the electric mower. An intelligent boundary of the electric mower is expanded by a topological structure of a CAN bus, and a development platform is provided for information-based precise control of the mower. Further, the CAN-bus-based electrical control system for an electric mower of the present disclosure has the advantages of a short development cycle, low development cost, and high degree of platformization as well as high degree of informatization and intelligence of development of the electric mower, which solves the problem of low degrees of informatization and intelligence of existing mowers, and provides an electrical control technical platform for development of mower derivatives, and the electrical control system is suitable for large-scale popularization and application.

DETAILED DESCRIPTION

The present disclosure may be explained in more detail by the following embodiments, to which the disclosure is not limited.

Figure 1:
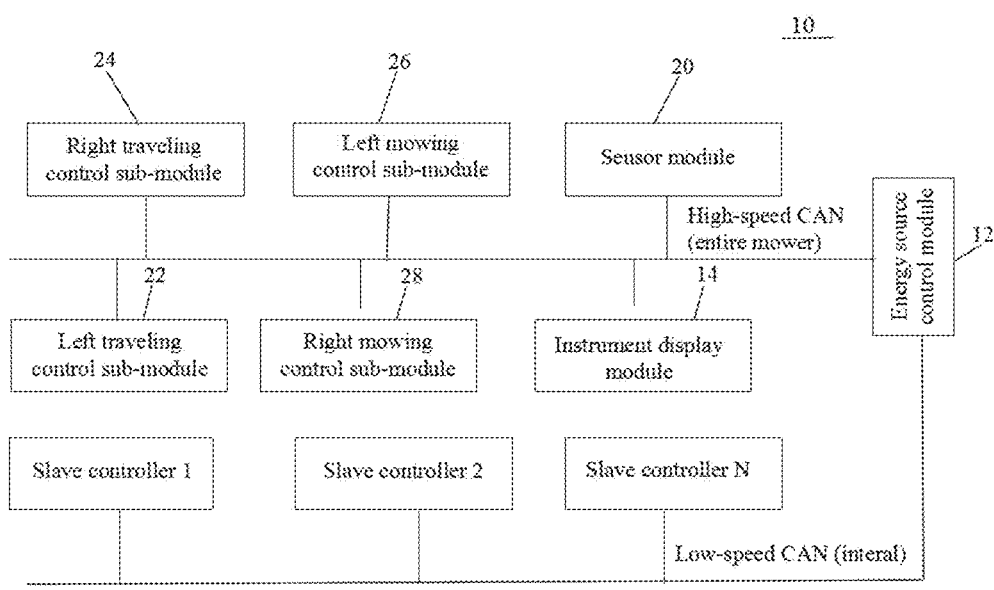
FIG. 1 is a diagram of a topological structure of a bus of a controller area network (CAN)-bus-based electrical control system for an electric mower according to the present disclosure.
Figure 2:
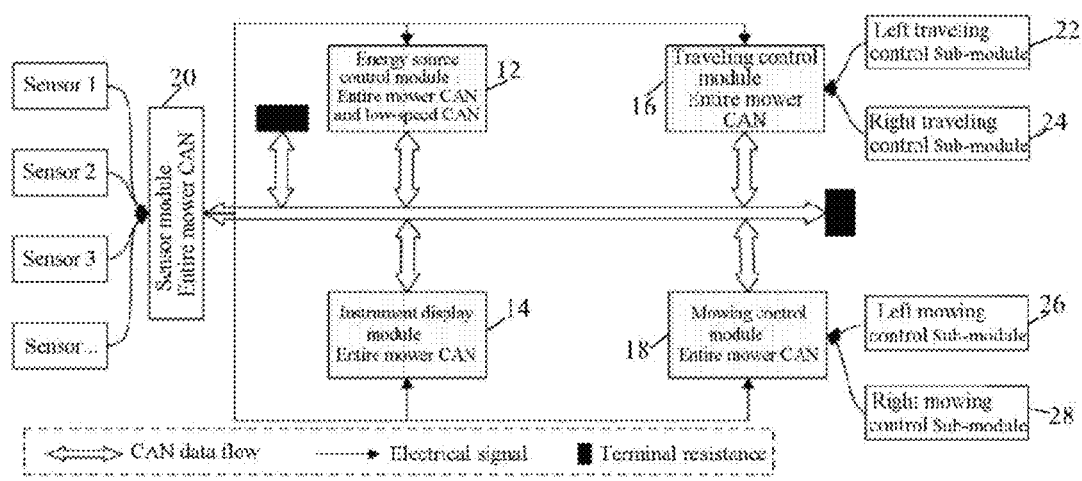
FIG. 2 is an electrical architecture diagram of an electric mower according to the present disclosure.

Referring to FIG. 1 and FIG. 2, a controller area network (CAN)-bus-based electrical control system for an electric mower 10 includes an energy source control module 12, an instrument display module 14, a traveling control module 16, a mowing control module 18, a sensor module 20, a high-speed CAN bus and a low-speed CAN bus. The energy source control module 12 is connected to the sensor module 20, the instrument display module 14, the mowing control module 18 and the traveling control module 16, respectively by the high-speed CAN bus, so that communication of the energy source control module 12 with the sensor module 20, the instrument display module 14, the mowing control module 18 and the traveling control module 16 is implemented. A master controller and a slave controller of the energy source control module are in communication by the low-speed CAN bus, so that communication between the master controller and slave controller is implemented. The master controller is responsible for signal acquisition, decision-making of control strategy and execution of instructions. The slave controller is responsible for signal acquisition and execution of instructions issued by the master. The master and slave controllers communicate through the bus, and the slave controller executes the instructions of the master controller.

The energy source control module 12 is configured to provide final drive energy and stores feedback energy of an electric mower.

The instrument display module 14 is configured to display a system operation state and fault key information of the electric mower, and gives an alarm.

The traveling control module includes a plurality of control sub-modules, to implement signal processing and drive control over a traveling motor of the electric mower.

The mowing control module 18 includes a plurality of control sub-modules, and is configured to implement signal processing and drive control over a mowing motor.

The sensor module 20 is configured to collect signals in forms of a hardwire signal, a switch signal, a voltage signal and a pulse signal, and perform state interaction by the high-speed CAN bus.

A logic threshold-based control mode is used among the energy source control module 12 and the instrument display module 14, the traveling control module 16, the mowing control module 18 and the sensor module 20 for processing of a motor signal, a safety switch signal, a battery signal, a braking signal and a control device signal. The signals are encapsulated, transmitted, analyzed and expressed by a CAN protocol packet to implement identification of a traveling state and a mowing state of the mower, and control over fault diagnosis and alarming. The energy source control module 12 includes functions of battery state monitoring, battery state analysis, switch control, energy management, battery safety protection, CAN communication management and charge management. The energy source control module 12 is configured to perform battery state analysis by monitoring a voltage of a battery cell, a total voltage of a battery, a charge-discharge current, a temperature of the battery and a signal, perform switch control according to a requirement of a control policy to implement charge-discharge control management of the battery, and perform real-time battery fault diagnosis and processing in a charge-discharge process. The function of battery state monitoring includes battery cell voltage monitoring, total voltage monitoring, current monitoring, temperature monitoring and signal monitoring. The function of battery state analysis includes battery state of charge (SOC) estimation, battery state of health (SOH) estimation and battery state of power (SOP) estimation, where an SOC is a current remaining electric quantity value of the battery, an SOH is a current health state value of the battery, and an SOP is estimated power of the battery. The function of switch control includes control over a charge-discharge relay or a metal-oxide-semiconductor (MOS) field-effect transistor, and a heating relay. The function of energy management includes battery charge-discharge control management and balance functions. The function of battery safety protection includes battery fault diagnosis and processing and loop interlock function detection. The function of CAN communication management includes CAN communication, diagnosis, calibration and program update of the electric mower. The function of charge management includes communication between and monitoring of a charging process between the battery and a charger.

The instrument display module 14 includes functions of CAN communication management, central information processing, fault alarming and information display. The instrument display module 14 analyzes and displays key information of the electric mower. First, CAN bus information is collected and analyzed by a function of high-speed CAN communication management. Valid information is analyzed and amplified according to CAN protocol provisions and then transmitted to the microcontroller unit. After central information analysis, an instrument display screen is driven to display information of an accumulated mileage, an electric quantity, a fault code, a braking state, a driving speed state, and a mowing speed state, and at the same time, voice alarm is driven in real time according to logic determination. The function of CAN communication management is to collect the CAN bus information, analyze and amplify the CAN bus information and transmit the CAN bus information to the microcontroller unit. The function of central information processing is configured to analyze a signal and drive the instrument display screen and voice alarming. The information display is to display CAN bus analysis information by a display screen module. Displayed information includes the accumulated mileage, the electric quantity, the fault code, the braking state, the driving speed state, and the mowing speed state.

As shown in FIG. 2, the traveling control module 16 includes a left traveling control sub-module 22 and a right traveling control sub-module 24, and the two traveling control sub-modules respectively control operation of two motors to achieve traveling and differential steering of the electric mower. Each of the traveling control sub-modules includes functions of power source conversion, signal collection, CAN communication management, motor control, motor enable management and fault monitoring analysis. The function of power source conversion includes converting a high-voltage direct-current power source into a low-voltage direct-current power source for internal use by the traveling control module 16 and external output, and maintaining a stable and reliable voltage output. The function of signal collection includes collection and conversion of signals from a motor Hall position sensor, a seat sensor, a control handle sensor, an enable switch, etc. The function of CAN communication management is configured for traveling control and includes functions of CAN communication, diagnosis, calibration, and program update of the electric mower and electric mower state message interaction. The function of motor control includes motor phase change control, and speed loop and current loop closed-loop control. The function of motor enable management is to determine a safety condition of motor driving by a safety analysis control module. The function of fault monitoring analysis is a fault monitoring analysis function.

During implementation, traveling control is mainly implemented by a left traveling motor controller, a right traveling motor controller and a traveling motor. It is noted that in some embodiment, the left travelling motor controller and the left travelling control sub-module are used interchangeably; and the right travelling motor controller and the right travelling control sub-module are used interchangeably. Specifically, the control sub-module or the controllers convert a high-voltage direct-current power source of a battery pack into a low-voltage direct-current power source used in the traveling control module by an internal power source conversion module, and outputs the stable and reliable low-voltage direct-current regulated power source used by the sensor to the outside. Moreover, a series of signals of the motor Hall position sensor, the seat sensor, the control handle sensor and the enable switch sensor are collected and converted into signals available for a main control chip. The signals are processed by an internal circuit. According to an established policy and in combination with enabling information obtained by the high-speed CAN bus, traveling drive is determined. In response to determining that a fault is discovered or safety condition is not satisfied, the fault is reported by the high-speed CAN bus, and drive is stopped. In response to determining that no fault is discovered and drive requirements are satisfied, motor phase change control is performed by an H bridge, and a speed loop and a current loop are provided for closed-loop control to drive the left motor and right motor. Steering of the electric mower is implemented by controlling speeds of the left motor and the right motor by the controllers or control sub-modules, to achieve a speed difference and differential steering. A high-speed CAN bus function can also include functions of online diagnosis, online calibration, control program update, etc.

The mowing control module 18 includes a left mowing control sub-module and a right mowing control sub-module, and the two mowing control sub-modules respectively control driving of two mowing motors to implement an output function of an electric mower and a tool.

Each of the mowing control sub-modules includes functions of power source conversion, signal collection, CAN communication management, motor control, motor enable management and fault monitoring analysis. The function of power source conversion includes converting a high-voltage direct-current power source into a low-voltage direct-current power source for internal use by the mowing control module and external output, and maintaining a stable and reliable voltage output. The function of signal collection includes collection and conversion of signals from a seat sensor, a control handle sensor, and an enable switch. The function of CAN communication management is configured for motor control and includes functions of CAN communication, diagnosis, calibration, and program update of the electric mower and electric mower state message interaction. The function of motor control includes motor phase change control, and speed loop and current loop closed-loop control. The function of motor enable management is to determine a safety condition of motor driving by a safety analysis control module. The function of fault monitoring analysis is a fault monitoring analysis function.

During implementation, mowing control is mainly implemented by a left mowing motor controller (e.g., a left mowing control sub-module), a right mowing motor controller (e.g., a right mowing control sub-module), a mowing motor and a tool. It is noted that, in some embodiments, the left mowing motor controller and the left mowing control sub-module are used interchangeably, and the right mowing motor controller and the right mowing control sub-module are used interchangeably. Specifically, the controller converts a high-voltage direct-current power source of a battery pack into a low-voltage direct-current power source used in the mowing control module by an internal power source conversion module. Moreover, signals of the seat sensor, the enable switch sensor, etc. are collected and converted into signals available for the main control chip. The signals are processed by an internal circuit. According to an established policy and in combination with enabling information obtained by the high-speed CAN bus, mowing power is output at two constant speeds of a high speed and a low speed. In a process, each controller or control module analyzes and determines fault and enabling conditions. In response to determining that a fault is discovered or safety condition is not satisfied, the fault is reported by the high-speed CAN bus, and drive is stopped. In response to determining that no fault is discovered and drive requirements are satisfied, the motor is controlled to implement mowing drive. The high-speed CAN bus function can also include functions of online diagnosis, online calibration, control program update, etc.

The sensor module includes a seat state sensor, a motor Hall sensor, a braking state sensor, a driving angle sensor, a control handle angle sensor, a Hall sensor, a handle enable sensor, a charge state sensor, a traveling speed state control switch and a plurality of enable switches. The seat state sensor is configured to detect whether a driver is present in a seat. The braking state sensor is configured to detect whether the electric mower is in a braking and parking state. The charge state sensor is configured to detect whether the electric mower is being charged. The handle enable sensor is configured to detect whether a handle is controlled effectively, and serves as a safety device. The above-mentioned signals provide conditions for safety determination, so that a traveling controller and a mowing controller determine whether the electric mower is operable. The motor Hall sensor is configured to monitor rotating speeds of a left traveling motor and a right traveling motor, and a control handle angle sensor converts a mechanical stroke of a control handle into a voltage analog quantity for a traveling motor controller to control an electric mower speed. The traveling speed state control switch, a mowing speed state control switch and a light switch are configured to provide input command signals for determining an electric mower state, and the signals are finally communicated to other control modules by the high-speed CAN bus.

Figure 3:
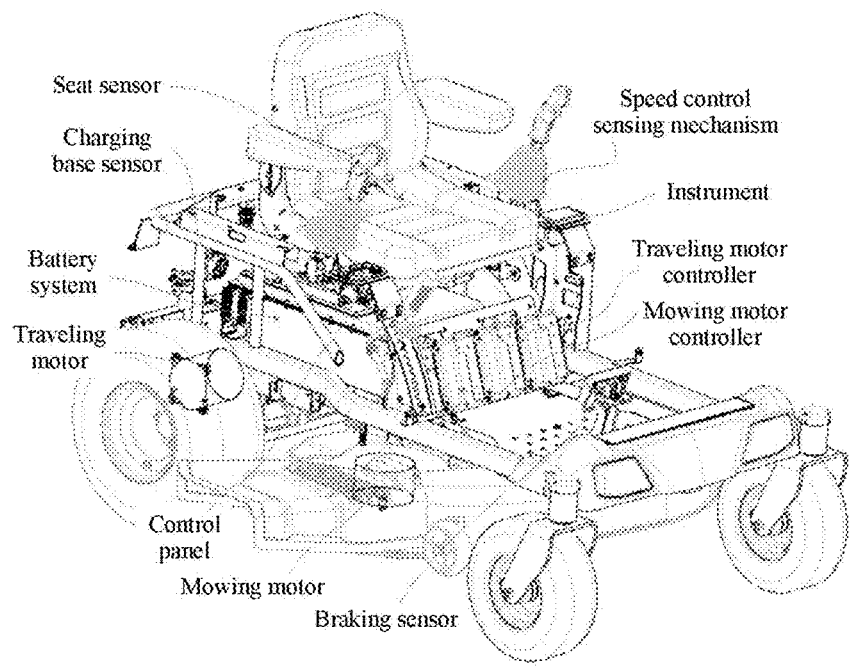
FIG. 3 is an electric mower, schematically illustrating electric components of the electric mower according to the present disclosure.

During specific implementation, the high-speed CAN bus has a speed of 500 kbps, and the low-speed CAN bus has a speed of 250 kbps. As shown in FIG. 1 to FIG. 2, system control nodes include an energy source control module 12, an instrument display module 14, a traveling control module 16, a mowing control module 18 and sensor modules 20 distributed at all monitoring points for collecting signals. FIG. 3 shows an electric mower 10, and schematically illustrates the positions of a seat sensor, a charging base sensor, a battery system, a traveling motor, a control panel, a mowing motor, a braking sensor, a speed control sensing mechanism, an instrument, a traveling motor controller, and a mowing motor controller are positioned on the electric mower 100.

Figure 4:
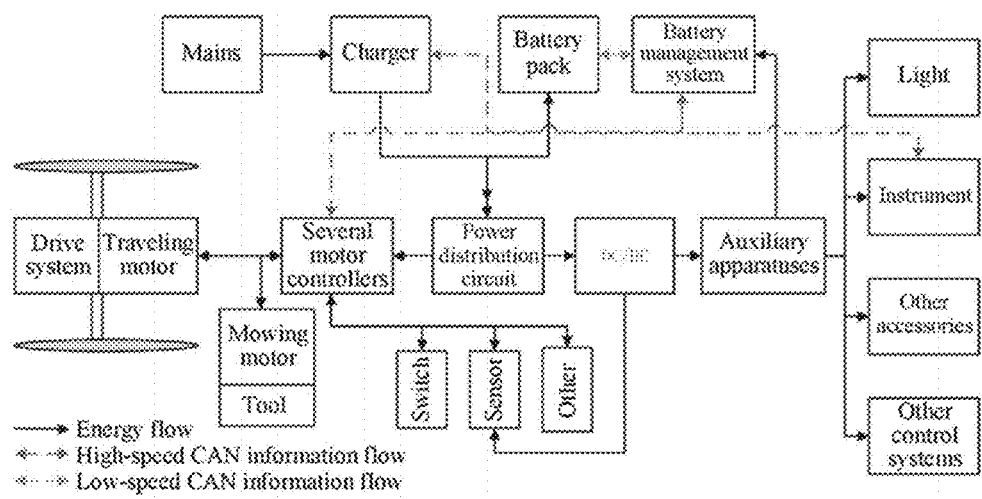
FIG. 4 is a block diagram of information flow transfer according to the present disclosure.

Further, the present disclosure provides a manner using a logic gate (logic threshold-based control) for processing a motor signal, a safety switch signal, a battery signal, a braking signal and a control device signal in the electrical system. The signals are encapsulated, transmitted, analyzed and expressed by a CAN protocol packet, so that signal transmission, interaction and action of each control module with the display module are implemented, and functions of identification of a traveling state and a mowing state of the mower and control over fault diagnosis and alarming are implemented. FIG. 4 shows energy transmission, signal transmission and bus information flow transmission of the electric mower 10 of the present disclosure. In some embodiments, the battery pack and a battery management system serve as the energy source control module, provide a final energy source for driving a controller module composed of the traveling control module and the mowing control module through a power distribution unit, and also provide an auxiliary power source for electric heating apparatus such as instruments through conversion of a direct-current (DC)/DC transformer. The sensor modules are configured to collect and monitor state information of all monitoring points of the electric mower. The instrument display module displays the state information of the electric mower to implement human-computer interaction. All modules communicate with each other by the high-speed CAN bus. Moreover, the energy management module achieves communication between the master controller and the slave controller by the low-speed CAN bus to implement collection and calculation of battery state information.

As shown in FIG. 4, the charger has a CAN bus communication function, and converts 100 VAC-240 VAC (50 Hz-60 Hz) alternating-current mains power into 48 V platform direct-current power to implement a charge function. DC/DC converts the 48 V direct current of the battery pack into the 12 V direct current to supply power to sensors, lights, instruments and other electrical appliances. An auxiliary apparatus may be connected to the DC/DC to supply the power to lights, instruments and other accessories and other control system. The power distribution circuit achieves electrical connection between modules and implement distribution and circulation of energy.

Further, in some embodiments, a high-speed CAN bus network with a speed of 500 Kb/s, and a low-speed CAN bus network with a speed of 250 Kb/s may be used. Alternatively, other speeds may also be used as the data transmission speeds in the solution according to analysis and calculation of the transmission amount and a load rate of information data of the bus. The energy system of the present disclosure provides 48 V platform high-voltage direct-current power source, and uses 12 V platform low-voltage direct-current power source. Alternatively, other high-voltage platforms and low-voltage platforms may also complete an electrical architecture of the electric mower under the condition that drive requirements of the electric mower can be satisfied.

Figure 5:
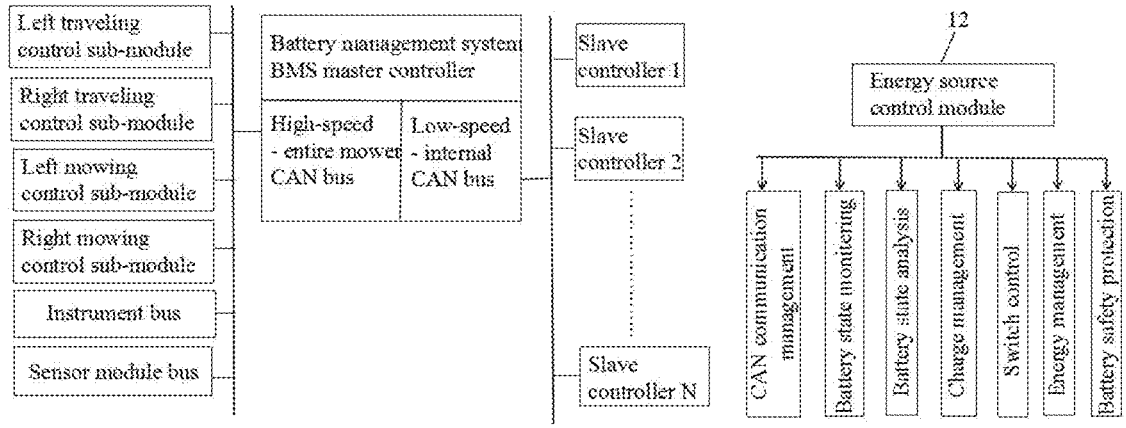
FIG. 5 is a topological architecture and functional architecture diagram of an energy source control module according to the present disclosure.

FIG. 5 shows the functions of battery state monitoring, battery state analysis, switch control, energy management, battery safety protection, CAN communication management, and charge management. Implementation of the above functions depends on the battery management system (BMS) in the module. The SOC, the SOH, the SOP, etc. of the battery are analyzed by monitoring a voltage of a battery cell, a total voltage of a battery, a charge-discharge current, a battery temperature and other signals, and the charge-discharge relay or MOS field-effect transistor is controlled in combination with an established safety protection policy, so that charge-discharge management is implemented, charge management is performed with the charger, a power source is provided for the traveling control module and the mowing control module. In the entire process, the CAN communication management module of the management system interacts and feeds back information with other modules of the electric mower by the high-speed CAN bus, and achieves communication between the master controller and the slave controller by the low-speed CAN bus.

An SOC is a current remaining electric quantity value of the battery, an SOH is a current health state value of the battery, and an SOP is estimated power of the battery. The function of CAN communication management includes functions of CAN communication, diagnosis, calibration, program update, etc. of the electric mower. The function of charge management includes monitoring and control of communication between the battery and the charger and the charge process.

Figure 6:
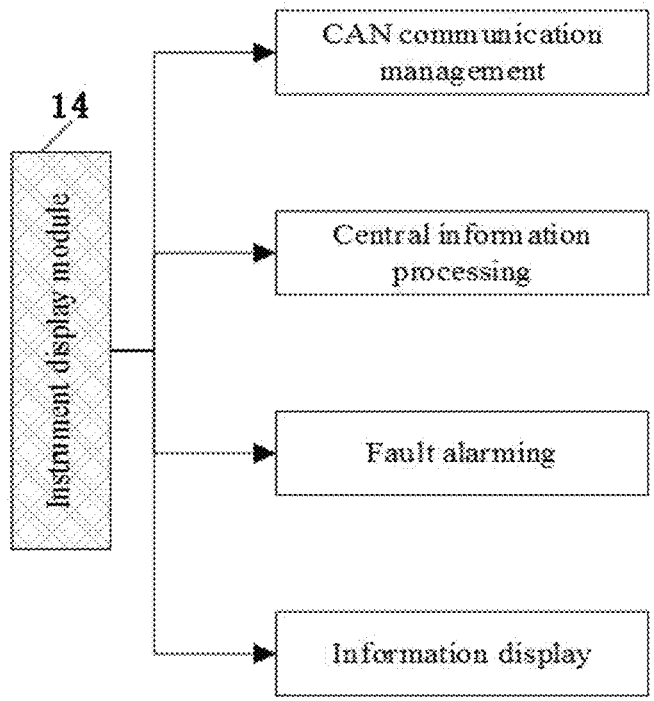
FIG. 6 is a functional architecture diagram of an instrument display module according to the present disclosure.

Further, the instrument display module 14 in the solution includes functions of CAN communication management, central information processing, fault alarming and information display. A functional architecture is shown in FIG. 6. The function of CAN communication management is to collect CAN bus information, analyze and amplify the CAN bus information and transmit the CAN bus information to the microcontroller unit. The microcontroller unit is configured to analyze the signals and drive the instrument display screen and voice alarming. The fault alarming is a sound alarming function. The information display is configured to display CAN bus analysis information in images by the display screen module.

Figure 7:
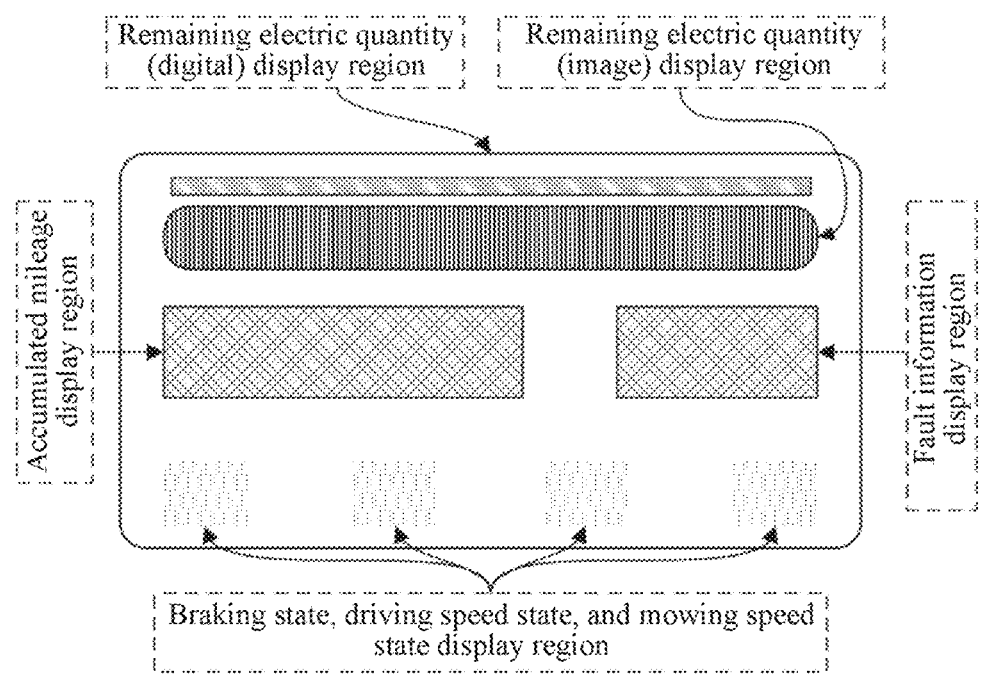
FIG. 7 is an instrument interface distribution diagram according to the present disclosure.

Instrument interface distribution is shown in FIG. 7. The instrument interface include display regions that display various of information such as an accumulated mileage, electric quantity (digital display or image display), fault information, braking state, driving speed state, mowing speed state.

Figure 8:
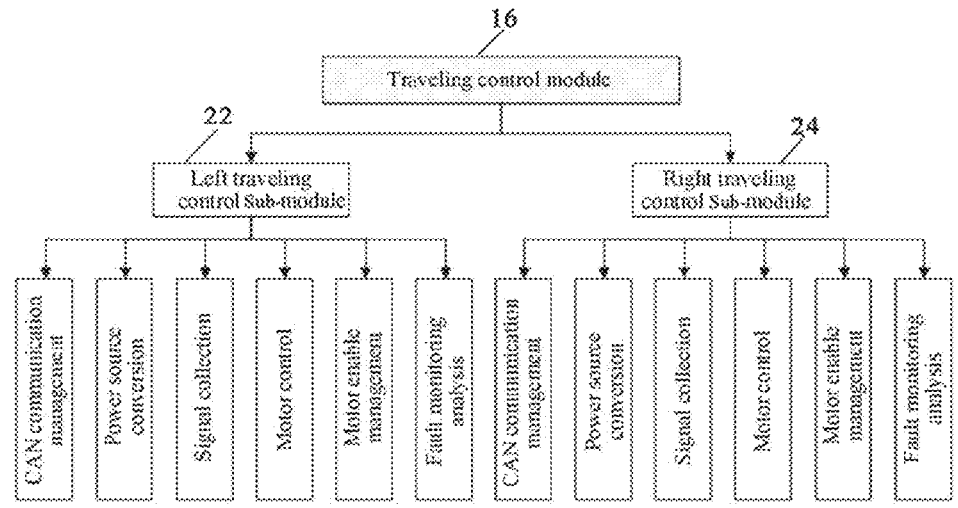
FIG. 8 is a functional architecture diagram of a traveling control module according to the present disclosure.

Further, as shown in FIG. 8, the traveling control module 16 includes two independent traveling drive control systems, that is, a left traveling control sub-module 22 and a right traveling control sub-module 24. Each control module includes functions of power source conversion, sensor signal management (e.g., signal collection), CAN communication management, motor control (e.g., brushless direct-current motor control), motor enabling analysis, fault monitoring analysis, etc. According to the established policy, the control system converts electrical energy in the energy system into mechanical energy for driving to implement output of electric mower traveling.

The function of power source conversion is to convert a 48 V direct-current power source into a 12 V direct-current power source for internal use by the traveling control module and external output, and maintaining a stable and reliable voltage output; the function of signal collection includes collection and conversion of signals from a motor Hall position sensor, a seat sensor, a control handle sensor, an enable switch sensor, etc.; the function of CAN communication management is configured for traveling control and includes functions of CAN communication, diagnosis, calibration, and program update of the electric mower and electric mower state message interaction determination; the function of motor control includes motor phase change control, and speed loop and current loop closed-loop control; the function of motor enable management is to determine a safety condition of motor driving by a safety analysis control module; and the function of fault monitoring analysis is a fault monitoring analysis function.

Figure 9:
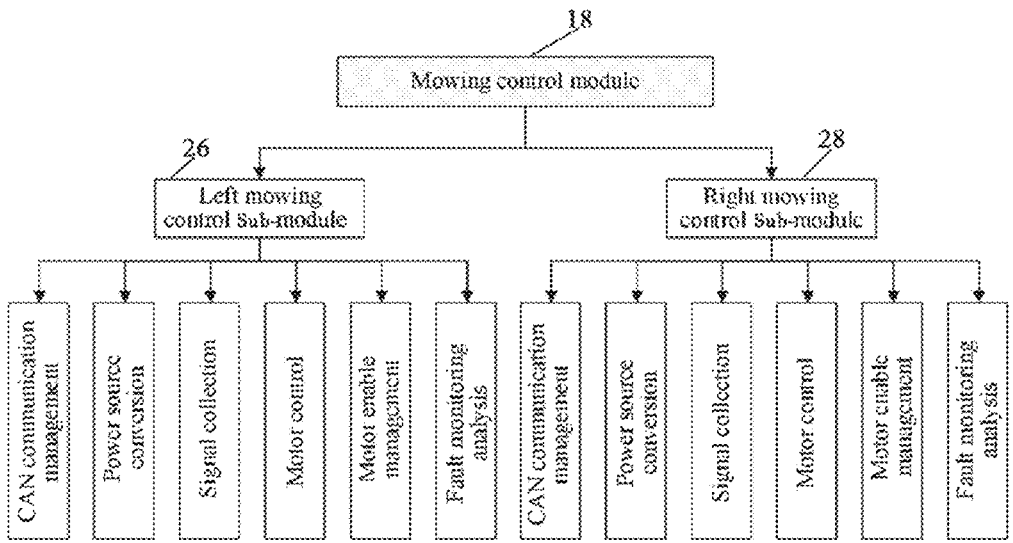
FIG. 9 is a functional architecture diagram of a mowing control module according to the present disclosure.

Further, as shown in FIG. 9, the mowing control module 18 includes two independent mowing drive control systems, that is, a left mowing control sub-module 26 and a right mowing control sub-module 28. Each control module includes functions of power source conversion, sensor signal management (e.g., signal collection), CAN communication management, motor control (e.g., brushless direct-current motor control), motor enabling analysis, fault monitoring analysis, etc. According to the established policy, the control system converts electrical energy in the energy system into mechanical energy for rotation of the tool, to implement power output of mowing labor.

The function of power source conversion is to convert a 48 V direct-current power source into a 12 V direct-current power source for internal use by the mowing control module and external output, and maintaining a stable and reliable voltage output; the function of signal collection includes collection and conversion of signals from a seat sensor, an enable switch sensor, etc.; the function of CAN communication management includes functions of CAN communication, diagnosis, calibration, and program update of the electric mower and electric mower state message interaction for mowing control determination; the function of motor control includes motor phase change control, and speed loop and current loop closed-loop control; the function of motor enable management is to determine a safety condition of motor driving by a safety analysis control module; and the function of fault monitoring analysis is a fault monitoring analysis function.

Figure 10:
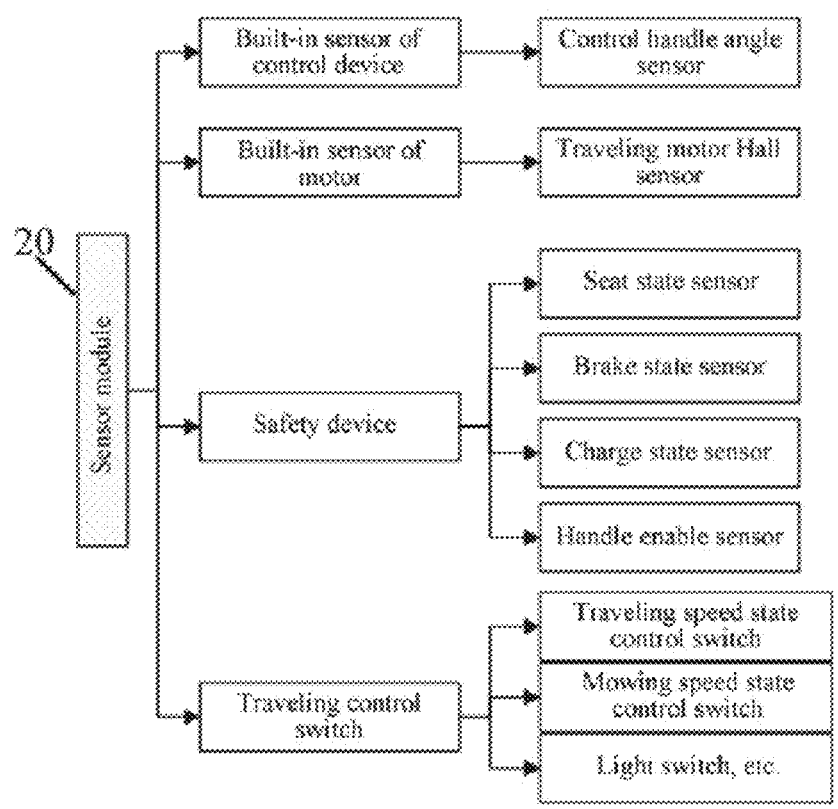
FIG. 10 is a functional architecture diagram of a sensor module according to the present disclosure.

Further, the sensor module 20 is as shown in FIG. 10. The seat state sensor is configured to detect whether a driver is present in the seat, and a collected signal is a switching value. The braking state sensor is configured to detect whether the electric mower is in a braking and parking state, and a collected signal is a switching value. The charging state sensor is configured to detect whether the electric mower is being charged, and a collected signal is a switching value. The handle enable sensor is configured to detect whether the handle is controlled effectively, and a collected signal is a switching value. The signals serve as conditions for safety determination, and are provided for the traveling controller and the mowing controller to determine whether the electric mower is operable. The motor Hall sensor is configured to monitor rotating speeds of the left traveling motor and the right traveling motor, and a collected signal is an analog signal. The control handle angle sensor converts the mechanical stroke of the control handle into a voltage analog quantity for the traveling motor controller to control the electric mower speed. The traveling speed state control switch, the mowing speed state control switch, the light switch, etc. are configured to provide input command signals for determining an electric mower state.

The controller area network (CAN)-bus-based electrical control system for an electric mower of the present disclosure achieves information interaction of the traveling motor controller, the mowing motor controller, the energy system controller, the sensor and the display controller unit through several CAN modules and other interfaces, and improves control precision, reliability and information processing efficiency of the electric mower of the electric mower, etc. The disclosure has the functions of CAN online monitoring, online diagnosis, online calibration, program updating, etc. The topological structure of the CAN bus expands the intelligent boundary of the electric mower. Moreover, the advantages of a short development cycle, low development cost, and high degrees of platformization, informatization and intelligence of development of the electric mower are achieved, the problem of low degrees of intelligence and informatization of existing mowers is solved, and an electrical control technical platform for development of mower derivatives is provided.

The parts of the disclosure not detailed are those in the prior art.

The embodiments selected herein for the purpose of disclosing the disclosure are presently considered to be suitable, but it should be understood that the disclosure is intended to include all variations and modifications of the embodiments that fall within the spirit and scope of the disclosure.

What is claimed is:

1. A controller area network (CAN)-bus-based electrical control system for an electric mower, comprising: an energy source control module, an instrument display module, a traveling control module, a mowing control module, a sensor module, a high-speed CAN bus and a low-speed CAN bus, wherein the energy source control module is connected to the sensor module, the instrument display module, the mowing control module and the traveling control module respectively by the high-speed CAN bus, so that communication of the energy source control module with the sensor module, the instrument display module, the mowing control module and the traveling control module is implemented; a master controller and a slave controller of the energy source control module are in communication by the low-speed CAN bus, so that communication between the master controller and slave controller is implemented;

wherein the energy source control module provides final drive energy and stores feedback energy of the electric mower;

the instrument display module displays a system operation state and fault key information of the electric mower, and issues an alarm;

the traveling control module comprises a left traveling control sub-module and a right traveling control sub-module, and the two traveling control sub-modules respectively control operation of a left traveling motor and a right traveling motor to achieve traveling and differential steering of the electric mower; each of the traveling control sub-modules comprises functions of power source conversion, signal collection, CAN communication management, motor control, motor enable management and fault monitoring analysis; the function of power source conversion comprises converting a high-voltage direct-current power source into a low-voltage direct-current power source for internal use by the traveling control module and external output, and maintaining a stable and reliable voltage output; the function of signal collection comprises collection and conversion of signals from a travelling motor Hall position sensor, a seat state sensor, a control handle angle sensor, and an enable switch; the function of CAN communication management is configured for traveling control and comprises functions of CAN communication, diagnosis, calibration, and program update of the electric mower and electric mower state message interaction; the function of motor control comprises motor phase change control, and speed loop and current loop closed-loop control; the function of motor enable management is to determine a safety condition of motor driving by a safety analysis control module; and the function of fault monitoring analysis has a fault monitoring analysis function;

the mowing control module comprises a plurality of sub-modules to implement signal processing and drive control over a mowing motor;

the sensor module collects signals in forms of a hardwire signal, a switch signal, a voltage signal and a pulse signal, and performs state interaction by the high-speed CAN bus;

wherein the sensor module comprises the control handle angle sensor, the travelling motor Hall sensor, the seat state sensor, a braking state sensor, a charge state sensor, a handle enable sensor, a traveling speed state control switch, a mowing speed state control switch, and a light switch; wherein the seat state sensor is configured to detect whether a driver is present in a seat, the braking state sensor is configured to detect whether the electric mower is in a braking and parking state; the charge state sensor is configured to detect whether the electric mower is being charged; the handle enable sensor is configured to detect whether a handle is controlled effectively; wherein the seat state sensor, the braking state sensor, the charge state sensor, and handle enable sensor serve as safety devices, and the signals of the seat state sensor, the braking state sensor, the charge state sensor, and the handle enable sensor provide conditions for safety determination, so that a controller of the traveling motors and a controller of the mowing motor determine whether the electric mower is operable; the travelling motor Hall sensor is configured to monitor rotating speeds of the left traveling motor and the right traveling motor, and the control handle angle sensor converts a mechanical stroke of a control handle into a voltage analog quantity for a traveling motor controller to control an electric mower speed; the traveling speed state control switch and the mowing speed state control switch are configured to provide input command signals for determining an electric mower state; the signals collected by the control handle angle sensor, the travelling motor Hall sensor, the seat state sensor, the braking state sensor, the charge state sensor, the handle enable sensor, the traveling speed state control switch, a mowing speed state control switch, and the light switch are converted and complied by a controller of the sensor module, and are communicated via the high-speed CAN bus; and a logic threshold-based control mode is used between the energy source control module and the instrument display module, the traveling control module, the mowing control module and the sensor module, and for processing of a motor signal, a safety switch signal, a battery signal, a braking signal and a control device signal, the signals are encapsulated, transmitted, analyzed and expressed by a CAN protocol packet, so that identification of a traveling state and a mowing state of the mower and control over fault diagnosis and alarming are implemented.

2. The CAN-bus-based electrical control system for an electric mower according to claim 1, wherein the energy source control module comprises functions of battery state monitoring, battery state analysis, switch control, energy management, battery safety protection, CAN communication management and charge management, and the energy source control module performs battery state analysis by monitoring a voltage of a battery cell, a total voltage of a battery, a charge-discharge current, a temperature of the battery and a signal, performs switch control according to a requirement of a control policy, to implement charge-discharge control management of the battery, and performs real-time battery fault diagnosis and processing in a charge-discharge process.

3. The CAN-bus-based electrical control system for an electric mower according to claim 2, wherein the function of battery state monitoring comprises battery cell voltage monitoring, total voltage monitoring, current monitoring, temperature monitoring and signal monitoring; the function of battery state analysis comprises battery state of charge (SOC) estimation, battery state of health (SOH) estimation and battery state of power (SOP) estimation, wherein an SOC is a current remaining electric quantity value of the battery, an SOH is a current health state value of the battery, and an SOP is estimated power of the battery; the function of switch control comprises control over a charge-discharge relay or a metal-oxide-semiconductor (MOS) field-effect transistor, and a heating relay; the function of energy management comprises battery charge-discharge control management and balance functions; the function of battery safety protection comprises battery fault diagnosis and processing and loop interlock function detection; the function of CAN communication management comprises CAN communication, diagnosis, calibration and program update of the electric mower; and the function of charge management comprises communication between and monitoring of a charging process between the battery and a charger.

4. The CAN-bus-based electrical control system for an electric mower according to claim 1, wherein the instrument display module comprises functions of CAN communication management, central information processing, fault alarming and information display, the instrument display module analyzes and displays key information of the electric mower, first, CAN bus information is collected and analyzed by a function of high-speed CAN communication management, valid information is analyzed and amplified according to CAN protocol provisions and then transmitted to a microcontroller unit, and after central information analysis, an instrument display screen is driven to display information of an accumulated mileage, an electric quantity, a fault code, a braking state, a driving speed state, and a mowing speed state, and at the same time, voice alarming is driven in real time according to logic determination.

5. The CAN-bus-based electrical control system for an electric mower according to claim 4, wherein the function of CAN communication management is to collect the CAN bus information, analyze and amplify the CAN bus information and transmit the CAN bus information to the microcontroller unit; the function of central information processing is configured to analyze a signal and drive the instrument display screen and voice alarming; and the information display is to display CAN bus analysis information by a display screen module, and displayed information comprises the accumulated mileage, the electric quantity, the fault code, the braking state, the driving speed state, and the mowing speed state.

6. The CAN-bus-based electrical control system for an electric mower according to claim 1, wherein the traveling control module comprises a left traveling control sub-module and a right traveling control sub-module, and the two traveling control sub-modules respectively control operation of two motors to achieve traveling and differential steering of the electric mower.

7. The CAN-bus-based electrical control system for an electric mower according to claim 1, wherein the mowing control module comprises a left mowing control sub-module and a right mowing control sub-module, and the two mowing control sub-modules respectively control driving of two mowing motors to implement an output function of the electric mower and a tool.

8. The CAN-bus-based electrical control system for an electric mower according to claim 6, wherein each of the traveling control sub-modules comprises functions of power source conversion, signal collection, CAN communication management, motor control, motor enable management and fault monitoring analysis, wherein the function of power source conversion comprises converting a high-voltage direct-current power source into a low-voltage direct-current power source for internal use by the traveling control module and external output, and maintaining a stable and reliable voltage output; the function of signal collection comprises collection and conversion of signals from the motor Hall position sensor, the seat sensor, the control handle sensor, and the enable switch; the function of CAN communication management is configured for traveling control and comprises functions of CAN communication, diagnosis, calibration, and program update of the electric mower and electric mower state message interaction for the motor control; the function of motor control comprises motor phase change control, and speed loop and current loop closed-loop control; the function of motor enable management is to determine a safety condition of motor driving by a safety analysis control module; and the function of fault monitoring analysis is a fault monitoring analysis function.

* * * * *